United States Patent [19]

Takiguchi et al.

[11] Patent Number: 4,472,105

[45] Date of Patent: Sep. 18, 1984

[54] ROTARY TYPE PUMPING MACHINE

[75] Inventors: Keitaro Takiguchi; Takao Kuwabara, both of Hitachi, Japan

[73] Assignee: Hitachi, Ltd., Tokyo, Japan

[21] Appl. No.: 469,641

[22] Filed: Feb. 25, 1983

[30] Foreign Application Priority Data

Feb. 26, 1982 [JP] Japan .................................. 57-28807

[51] Int. Cl.$^3$ ............................................. F01D 17/00
[52] U.S. Cl. ....................................... 415/13; 415/24; 415/26; 415/43; 415/500; 251/31
[58] Field of Search ................... 415/1, 500, 24, 43, 415/26, 13; 251/30, 31

[56] References Cited

U.S. PATENT DOCUMENTS

| | | | |
|---|---|---|---|
| 3,960,463 | 6/1976 | Okada et al. | 415/500 |
| 3,981,478 | 9/1976 | Lundsgart | 251/30 |
| 4,014,624 | 3/1977 | Takase et al. | 415/500 |
| 4,158,525 | 6/1979 | Kawase | 415/500 |

FOREIGN PATENT DOCUMENTS

| | | | |
|---|---|---|---|
| 9943 | 1/1978 | Japan | 415/500 |
| 35109 | 12/1980 | Japan | 415/500 |
| 724629 | 3/1961 | U.S.S.R. | 415/26 |

Primary Examiner—Stephen Marcus
Assistant Examiner—Brian J. Bowman
Attorney, Agent, or Firm—Beall Law Offices

[57] ABSTRACT

A rotary type pumping machine such as a pump turbine in a pumped storage hydro-electric plant, wherein, when the pumping operation of the runner of the machine is started, compressed air is introduced into the runner chamber to depress the water surface in the runner chamber to facilitate the start up of the runner and, when the runner is accelerated to a predetermined speed, the air in the runner chamber is discharged through an air discharge valve to commence the pumping operation. Water pressure available in the water passageway on upper reservoir side of the runner chamber is applied to the valve closing mechanism of the air discharge valve. The valve opening force exerted by a valve operating mechanism and acting on the valve opening mechanism of the air discharge valve is selected to be greater than the valve closing force generated by the water pressure applied to the valve closing mechanism of the air discharge valve. Therefore, the air discharge valve is closed without fail even when the valve operating force exerted by the valve operating mechanism is lost.

7 Claims, 4 Drawing Figures

ROTARY TYPE PUMPING MACHINE

BACKGROUND OF THE INVENTION

The present invention relates to a rotary type pumping machine of the type in which compressed air is supplied into the machine to facilitate the starting up of the machine. More particularly, the invention is concerned with a rotary type water-lift machine of the type mentioned above, having an air discharging valve for discharging the compressed air introduced into the runner chamber.

Pumped storage hydro-electric plant is known as a power generating plant which is able to pump up the water to an upper reservoir of a certain height above a water turbine which in such a case operates as a pump driven by surplus electric power and generating electric power by making use of the water in the upper reservoir at the time of peak load. In the starting up of the large-size rotary type pumping machine used in this type of plant, it is an ordinary measure to introduce compressed air into the runner chamber to depress the water in the chamber to a predetermined level in the draft pipe to reduce the starting torque for starting the runner and, when the runner speed is increased to a predetermined speed, the air is discharged to commence the ordinary pumping operation.

In recent years, there is a demand for greater head and capacity in the field of the pumped storage hydro-electric plant. In addition, this type of hydro-electric plant is usually constructed as an underground plant. Therefore, the air and water discharged from various portions of the plant gather in a water collecting pit provided in the plant and are discharged therefrom by, for example, a water discharge pump.

According to this arrangement, however, there is a fear that the water overflows the water collecting pit and, in the worst case, the plant as a whole is flooded by the water, when the water discharge pump becomes inoperative due to, for example, a power failure in the plant or when the flowing rate of the water into the water collecting pit exceeds the capacity of the water discharge pump.

Particularly, in the pumped storage hydro-electric plant having an air discharge valve for discharging compressed air from the runner chamber, the water may flow back at a large rate from the draft pipe through the runner chamber to cause the overflow of water from the water collecting pit dangerously, if the air closing of the discharge valve is failed due to a trouble in the valve operating system for example.

SUMMARY OF THE INVENTION

Accordingly, an object of the invention is to provide a rotary type pumping machine of the type having an air discharge valve which can be closed without fail even in the case of a trouble in the valve operation system to prevent overflow of the water collecting pit in the plant.

To this end, according to the invention, there is provided a rotary type pumping machine such as a pump turbine in a pumped storage hydro-electric plant, wherein, when the pumping operation of the runner of the machine is started, compressed air is introduced into the runner chamber to depress the water surface in the runner chamber to facilitate the start up of the runner and, when the runner is accelerated to a predetermined speed, the air in the runner chamber is discharged through an air discharge valve to commence the pumping operation. Water pressure available in the water passageway upstream the runner is applied to the valve closing mechanism of the air discharge valve. The valve opening force exerted by a valve operating mechanism and acting on the valve opening mechanism of the air discharge valve is selected to be greater than the valve closing force generated by the water pressure applied to the valve closing mechanism of the air discharge valve. Therefore, the air discharge valve is closed without fail even when the valve operating force exerted by the valve operating mechanism is lost.

These and other objects, features and advantages of the invention will become clear from the following description of the preferred embodiment taken in conjunction with the accompanying drawings.

DESCRIPTION OF THE PREFERRED EMBODIMENTS

Figure 1:
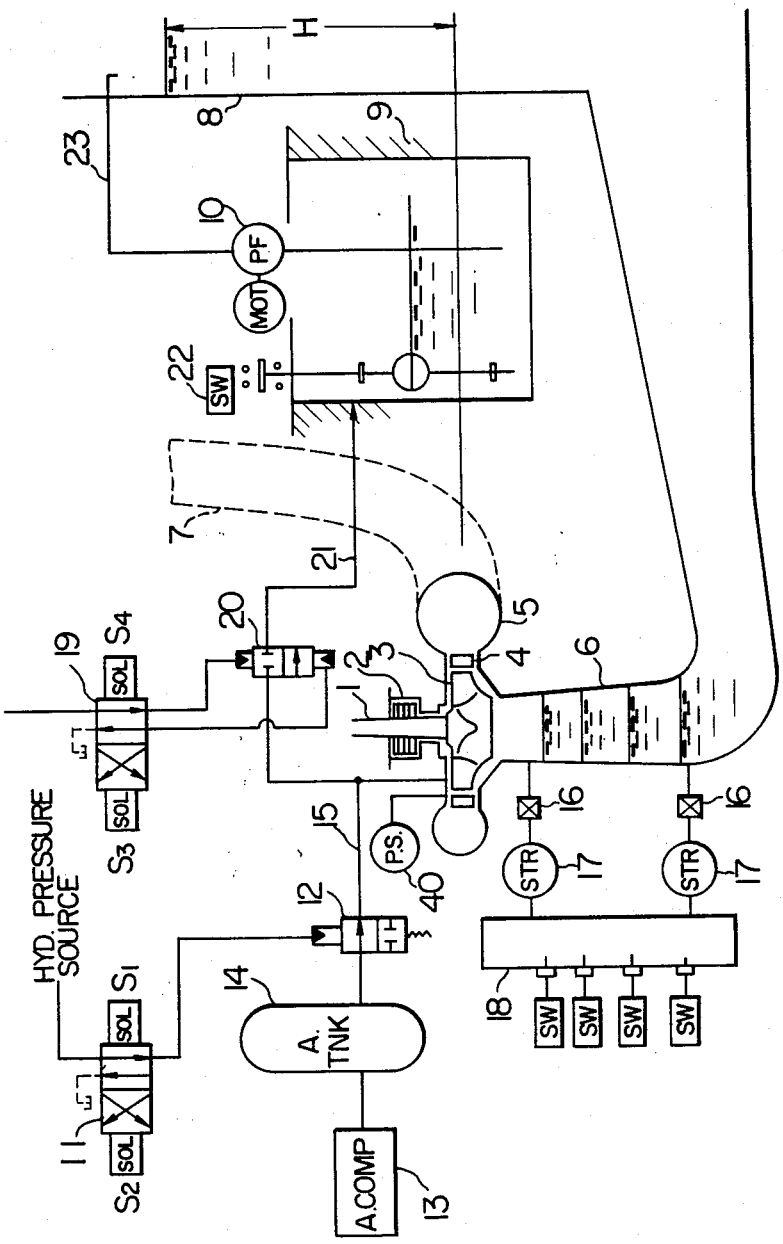
FIG. 1 is a schematic illustration of a conventional rotary type pumping machine used in a pumped storage hydro-electric plant.

Before turning to the description of the embodiments of the invention, an explanation will be made here with specific reference to FIG. 1 to outline the construction and operation of an example of the rotary type pumping machine conventionally used in pumped storage hydro-electric plant, in order to facilitate the understanding of the invention. The rotary type pumping machine shown in FIG. 1 has a pump turbine which can serve also as a water turbine. The pump turbine has a main shaft 1 which is supported rotatably and connected at its one end to a driving motor which serves as a generator when the pump turbine works as a water turbine for power generation. The pump turbine also has a packing box 2 which provides a water- and air-tight seal around the main shaft 1, a runner 3 connected to the other end of the main shaft 1, guide vanes 4 and a casing 5 surrounding the runner 3. A penstock 7 communicating with an upper reservoir and workable as a delivery pipe in pumping operation of the machine is connected to one side of the casing 5. A draft pipe connected to the bottom of the runner chamber is communicated with a lower reservoir 8. Air and water wasted or discharged from various portions of the plant are collected in a water collecting pit 9 provided in the plant. The water collected in the water collecting pit 9 is discharged to the lower reservoir 8 through a water discharge pipe 23 by means of a water discharging pump 10.

Besides the basic constituents mentioned above, the pump turbine is provided with a compression air supplying system including an air supply valve 12, for depressing the water surface from the runner chamber down to a predetermined level in the draft tube 6 to make the runner idle to reduce the starting torque when the pump turbine starts to operate, and an air discharge valve 20 for discharging the compressed air to the outside of the runner chamber, as well as systems or mechanisms for operating the compressed air supplying system and the air discharge valve 20.

In starting the pumping operation of the pump turbine, a solenoid S1 of a solenoid valve 11 for operating the air supply valve 12 is energized so that a pressurized oil from a pressurized oil source is supplied through an oil pipe to the air supply valve 12 which is of spring offset type, thereby to open the air supply valve 12. Since the air supply valve 12 is connected to an air tank 14 which in turn is connected to an air compressor, the compressed air is introduced into the runner chamber through an upper portion of the casing 5, via the air supply valve 12 and an air supply pipe 15, so that the water is depressed from the runner chamber into the draft pipe 6. When the compressed air is supplied into the runner chamber, the guide vanes take a closed position to prevent water from flowing back from the upper reservoir into the runner chamber, so that the runner chamber is kept closed.

As the water surface is lowered to a predetermined level in the draft pipe 6, a water level detector 18 including elements such as a stop valve 16 and a strainer 17 is started to de-energize the above-mentioned solenoid S1 and to energize a solenoid S2 instead. As a result, the valve opening oil port of the air supply valve 12 is connected to an oil return line so that the air supply valve 12 is closed by the offset spring to stop the supply of air. The runner is started in this state to rotate in the air.

The rotational speed of the runner is observed through a speed detector (not shown). Then, as a predetermined runner speed is reached and the driving motor is connected to the transmission line, a solenoid S3 of a solenoid valve 19 for operating the air discharge valve 20 is energized to switch the oil supply to a port for opening operation of the air discharge valve 20 thereby to open the latter. In consequence, the compressed air is discharged from the runner chamber into the water collecting pit 9, through the air discharge valve 20 and the air discharge pipe 21. Thus the water level in the draft pipe 6 is raised as a result of the discharge of the compressed air. And as soon as the water level touches the runner, the water in the draft pipe 6 is forcibly moved to the outer peripheral portion of the rotating runner 3 so that a rise of water pressure takes place between the guide vane 4 and the runner 3. As the water pressure is increased beyond a predetermined level, a pressure switch 40 is turned on to permit energization of a solenoid S4 of the solenoid valve 19 instead of the solenoid S3 of the same, so that the pressurized oil is directed to the valve closing port of the air discharge valve 20 thereby to close the valve. The water which has resumed the initial level in the runner chamber is pressurized to a high pressure or head by the rotating runner 3. And as soon as the guide vanes 4 are opened, the water is pumped up to the upper reservoir through the penstock 7. In FIG. 1, a reference numeral 22 in the water collecting pit 9 designates a water level detector.

Assume here that the closing of the air discharge valve 20 is failed accidentally due to a trouble such as a control electric power failure in the electric line for the solenoid valve 19 which operates the air discharge valve 20, in the rotary type pumping machine having the construction explained hereinabove. In such a case, the water in the lower reservoir is naturally moved by the pressure corresponding to the suction head H of the water level into the water collecting pit 9 through the air discharge valve 20 and the air discharge pipe 21, at a flow rate which is generally several times as large as the water discharging capacity of the water discharge pump 10. In consequence, the water soon overflows the water collecting pit to dangerously flood the power generating plant as a whole.

Figure 2:
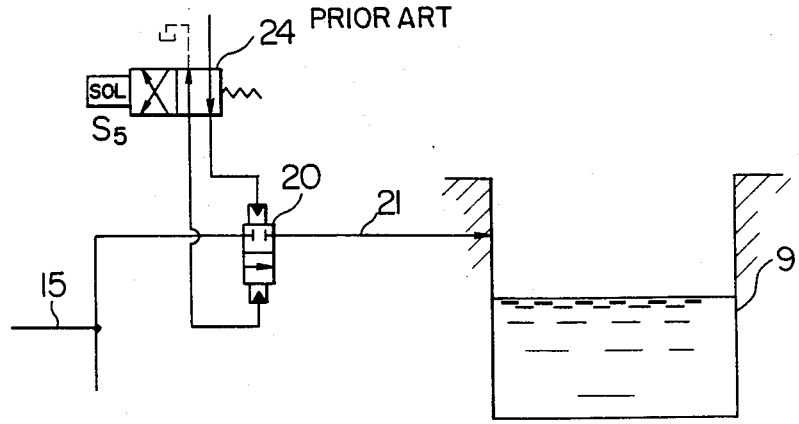
FIG. 2 is an illustration of an essential part of a prior art intended for improvement of the conventional machine shown in FIG. 1.

In order to obviate the problem stated hereinbefore, a proposal has been made in which a spring-offset single-solenoid type solenoid valve 24 as shown in FIG. 2 is used in place of the double-solenoid type solenoid valve 19 shown in FIG. 1. When a solenoid S5 is energized, this solenoid valve 24 supplies the pressurized oil to the valve opening port to open the air discharge valve 20. However, as the solenoid S5 is de-energized, the solenoid valve 24 is automatically switched to connect the pressurized oil line to the valve closing port automatically by the force of the offset spring, thereby to close the air discharge valve 20. This countermeasure is quite effective in preventing the accidental closing failure of the air discharge valve 20 atributable to a loss of control electric power for the solenoid valve 24 but cannot prevent the closing failure of the air discharge valve 20 caused by a loss of hydraulic pressure for operating the air discharge valve 20. Thus, the problem of possibility of overflow of the water collecting pit still remains unsolved.

This problem, however, is overcome by the present invention as will be understood from the following description of the preferred embodiment.

Figure 3:
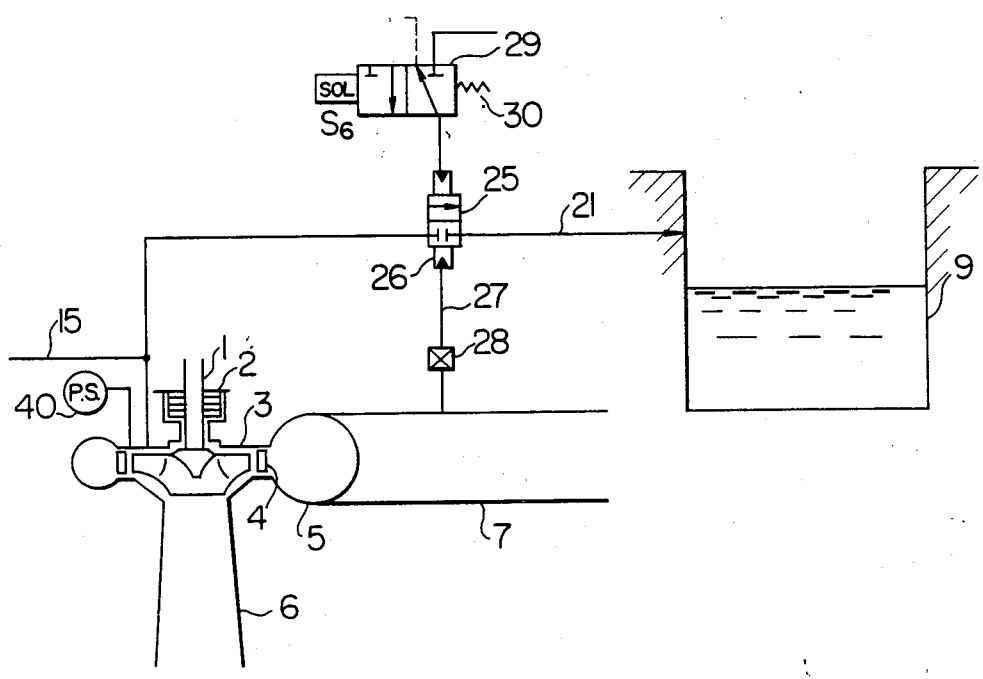
FIG. 3 is an illustration of an essential part of a rotary-type pumping machine in accordance with an emboidment of the invention.

FIG. 3 shows an embodiment of the invention applied to a rotary type pumping machine of a construction similar to that shown in FIG. 1. In FIG. 3, therefore, parts or members similar to those in FIG. 1 are neglected and only the portions pertinent to the embodiment are shown.

The rotary type pumping machine of this embodiment has an air discharge valve 25 of a construction similar to that shown in FIG. 1. The air discharge valve 25 of this embodiment, however, has a valve closing port 26 which is communicated with a portion of the penstock 7 or the casing 5, through a conduit 27 and a stop valve. In addition, a single-solenoid type solenoid valve 29 with an offset spring and having three ports is used as the solenoid valve for operating the air discharge valve 25. The solenoid valve 29 is connected to the valve open port of the air discharge valve 25 through a hydraulic pipe.

In the operation of the rotary type pumping machine of this embodiment, compressed air is introduced through an air supply pipe 15 into the runner chamber to depress the water surface at the time of starting up of the runner 3, as in the case of the conventional machine explained before in connection with FIG. 1. As the runner is accelerated to a predetermined speed, and the driving motor is connected to the transmission line, a solenoid S6 of the solenoid valve 29 is energized to permit the supply of the pressurized oil to the air discharge pipe 25 thereby to open the latter. The arrangement is such that, as the hydraulic pressure is applied to the valve opening port of the air discharge valve 25, the air discharge valve 25 is opened overcoming the force produced by the water pressure in the penstock 7 applied through the valve closing port 26. In consequence, the compressed air in the runner chamber is relieved to the water collecting pit 9 through the air discharge pipe 21. After the completion of discharge of the air from the runner chamber, the solenoid S6 is de-energized so that the solenoid valve 29 is automatically switched to the illustrated position by the resetting force exerted by the offset spring 30. At the same time, the air discharge valve 25 is closed by the force produced by the water pressure in the penstock 7.

As will be understood from the foregoing description, in the rotary type pumping machine of the invention, the high water pressure or head in the penstock 7 corresponding to the height of the water level in the upper reservoir above the runner 3 is introduced to act on the air discharge valve 25 through the conduit 27 and the valve closing port. In consequence, the air discharge valve 25 is closed without fail to prevent the reversing flow of water into the water collecting pit 9, even when the air discharge valve 25 has become uncontrollable due to a control electric power failure in the electric line for the solenoid valve 29 or a trouble in the hydraulic line for operating the air discharge valve 25.

Figure 4:
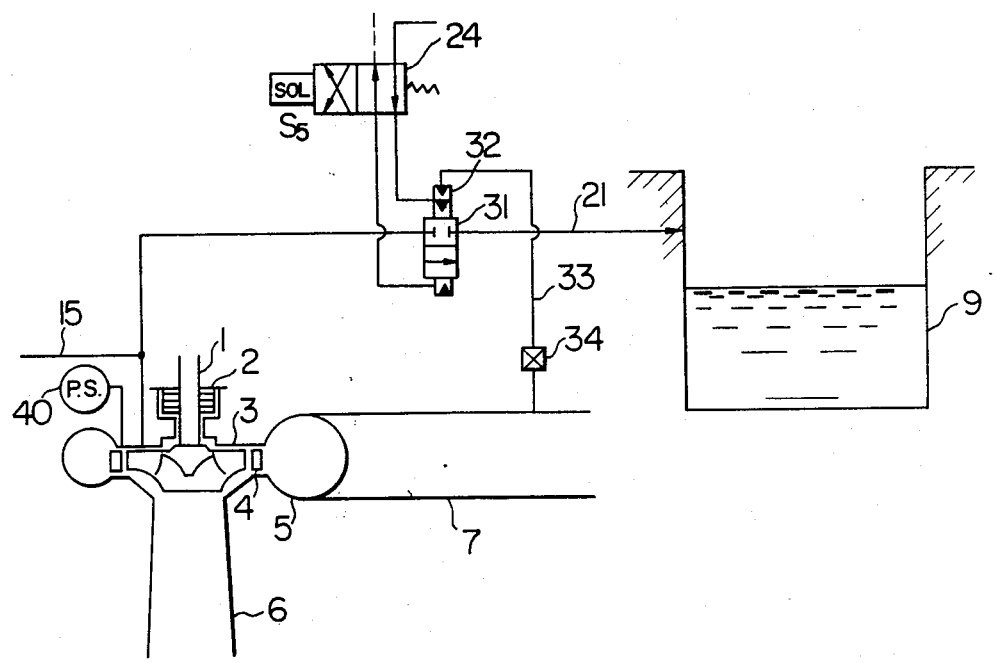
FIG. 4 is an illustration of an essential part of another embodiment of the invention.

The embodiment described hereinbefore in connection with FIG. 3 is only illustrative, and the invention can be embodied in various other forms. For instance, FIG. 4 shows another embodiment which is used in combination with the known arrangement explained before in connection with FIG. 2. Namely, the embodiment shown in FIG. 4 has a water pressure cylinder 32 which is provided in the valve closing mechanism of the air discharge valve 31 and adapted to act in the valve closing direction for closing the air discharge valve 31. As in the embodiment shown in FIG. 3, the water pressure cylinder 32 is connected to a portion of the penstock 7 or the casing 5. In this embodiment, therefore, the solenoid valve 24 is automatically moved to the illustrated position by the force of the offset spring when the solenoid S5 is accidentally de-energized due to a control electric power failure in the electric line for the solenoid valve 24, and the air discharge valve 31 is closed by the sum of the force produced by the pressurized oil and the force produced by the water pressure acting on the water pressure cylinder 32. The closing of the air discharge valve 31 is made without fail even when the hydraulic valve closing power is lost, because the water pressure in the penstock 7 reliably acts to close the air discharge valve 31.

As has been described, according to the invention, there is provided a rotary type pumping machine in which the starting torque is decreased by a depression of the water surface by introduction of compressed air into the runner chamber, wherein the water pressure available at the upper reservoir side of the pumping machine is applied to the valve closing mechanism of an air discharge valve which controls the discharge of the compressed air from the runner chamber, thereby to obviate the problems such as overflowing of the water collecting pit which may lead to a serious accident such as flooding of the facilities, even in the case of loss of electric power for controlling the air discharge valve or hydraulic pressure for operating the same.

Although the invention has been described through specific terms, it is to be noted that the described embodiments of the invention are not exclusive and various changes and modifications may be imparted thereto without departing from the scope of the invention which is limited solely by the appended claims. For instance, although only one air discharge valve is provided the rotary type pumping machine of each embodiment, the machine can have a conventional air discharge valve as shown in FIGS. 1 or 2, in combination with the air discharge valve in accordance with the invention.

What is claimed is:

1. A rotary type pumping machine comprising: a runner connected to a driving motor; a runner chamber which accomodates said runner; water flow regulating means to be closed prior to depression of the water surface in said runner chamber; water passageways connected to said runner chamber through the water flow regulating means on the upper reservoir side and connected to the bottom of said runner chamber; a compressed air source connected to said runner chamber; an air discharge valve connected to said runner chamber; and an operation mechanism adapted to control, at the time of starting of said runner, said compressed air source so as to introduce the compressed air into said runner chamber thereby to depress the water surface and adapted to control said air discharge valve to discharge the compressed air from said runner chamber when said runner is accelerated to a predetermined speed and to close said air discharge valve upon completion of the discharge of said compressed air; wherein the improvement comprises that the water pressure available in the water passageway on the upper reservoir side of said runner is applied to the valve closing mechanism for closing said air discharge valve, and that the valve operating force exerted by said operating mechanism on the valve opening mechanism for opening said air discharge valve is selected to be greater than the valve operating force exerted by said water pressure on said valve closing mechanism, thereby to ensure safe closing of said air discharge valve even when the valve operating force exerted by said operating mechanism is lost.

2. A rotary type pumping machine according to claim 1, wherein said air discharge valve is adapted to be operated by pressurized oil while said operating mechanism is a solenoid valve, said solenoid valve being connected to a pressurized oil source and to said air discharge valve such that, when the solenoid of said solenoid valve is energized, the pressurized oil from said pressurized oil source is introduced to the valve opening mechanism of said air discharge valve, whereas, when said solenoid is de-energized to automatically switch said solenoid valve, said pressurized oil residing in said valve opening mechanism is relieved.

3. A rotary type pumping machine according to either one of claims 1 and 2, wherein said water pressure available in said water passageway on the upper reservoir side of said runner is solely applied to said valve closing mechanism of said air discharge valve to close the latter.

4. A rotary type pumping machine according to either one of claims 1 and 2, wherein a water pressure operating member which acts in the direction for closing said air discharge valve is provided in the valve closing mechanism of said air discharge valve, so that said air discharge valve is operated in the closing direction by the sum of the valve closing force exerted by said operating mechanism on said valve closing mechanism and the force generated by said water pressure available in the water passageway on the upper reservoir side of said runner and acting on said water pressure operating member.

5. A pump turbine apparatus for pumped storage hydro-electric plant having a runner connected to a driving/power generating means, a runner chamber accomodating said runner, a penstock connecting said runner chamber through water flow regulating means to an upper reservoir, a draft pipe connecting said runner chamber to a lower reservoir, a compressed air source connected to said runner chamber, an air discharge valve connected to said runner chamber, and an operating mechanism adapted to control, at the time of starting of pumping operation of said runner, said compressed air source to introduce the compressed air into said runner chamber to depress the water surface so as to reduce the starting torque for starting said runner and adapted to operate said air discharge valve by the force of pressurized oil in such a manner as to permit the discharge of said compressed air from said runner chamber when said runner is accelerated to a predetermined speed and to close said air discharge valve upon completion of the discharge of said compressed air, wherein the improvement comprises that said operating mechanism includes a solenoid valve with an offset spring, said solenoid valve being connected to a pressurized oil source and to said air discharge valve such that, when the solenoid of said solenoid valve is energized, the pressurized oil is introduced to a valve opening mechanism of said air discharge valve, whereas, when said solenoid is de-energized, said solenoid valve is automatically switched by the force of said offset spring to relieve the pressurized oil residing in said valve open mechanism of said air discharge valve, and that the water pressure available in said penstock is applied to a valve closing mechanism of said air discharge valve, the valve operating force exerted by said operating mechanism on the valve opening mechanism for opening said air discharge valve is selected to be greater than the valve operating force exerted by said water pressure on said valve closing mechanism, thereby to ensure safe closing of said air discharge valve even when the valve operating force exerted by said operating mechanism is lost.

6. A pump turbine apparatus according to claim 5, wherein the water pressure in said penstock is applied solely to said valve closing mechanism of said air discharge valve.

7. A pump turbine apparatus according to claim 5, wherein said valve closing mechanism of said air discharge valve is provided with a water pressure cylinder which acts in the valve closing direction, so that said air discharge valve is closed by the sum of the valve closing force exerted by the pressurized oil supplied through said solenoid valve and the valve closing force generated by said water pressure in said penstock applied to said water pressure cylinder.

* * * * *